April 21, 1970 R. J. WALKER 3,507,275
MOUTH FLUSHING APPARATUS

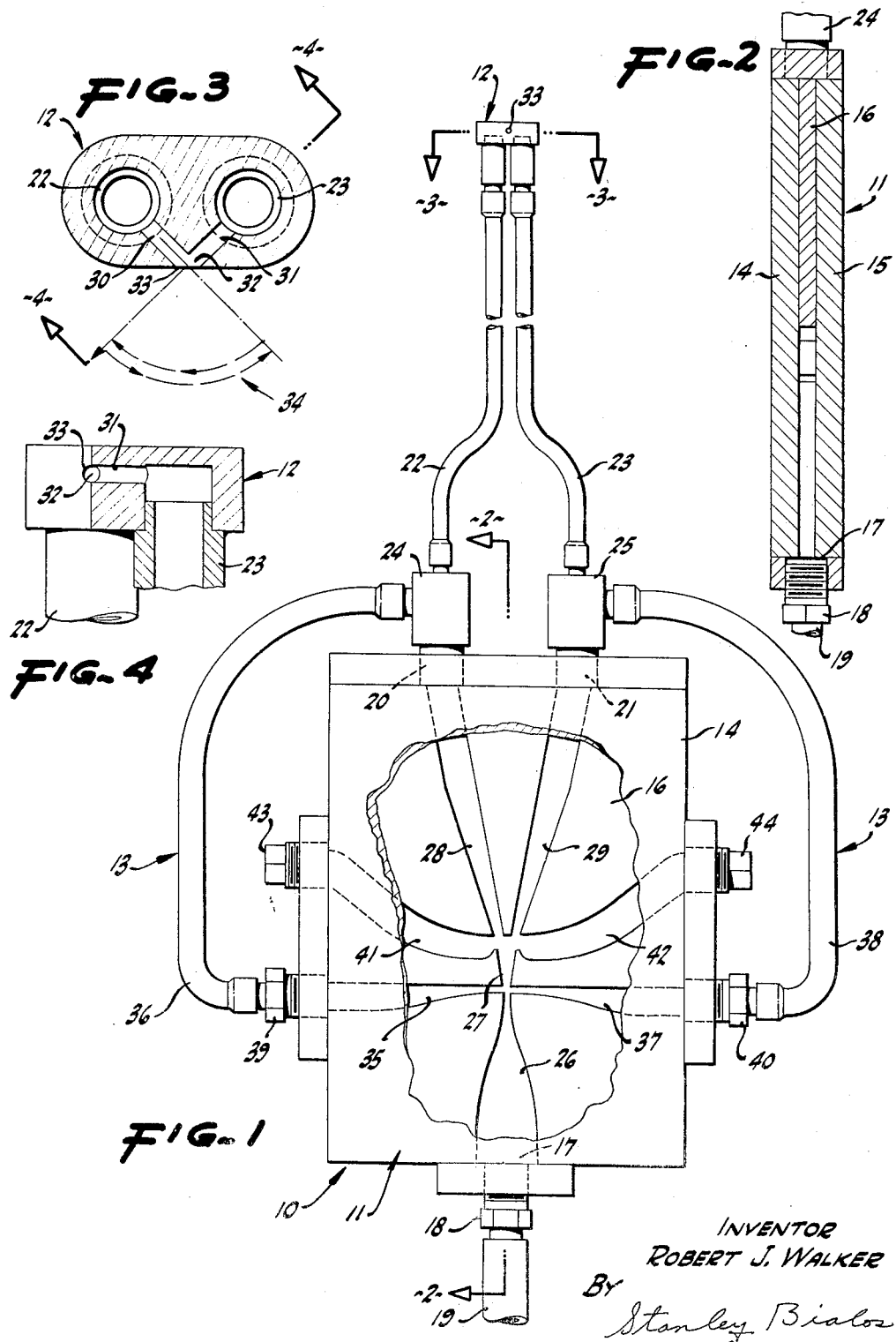
April 21, 1970     R. J. WALKER     3,507,275
MOUTH FLUSHING APPARATUS
Filed Aug. 17, 1966     3 Sheets-Sheet 1
INVENTOR
ROBERT J. WALKER
BY Stanley Bialos
ATTORNEY

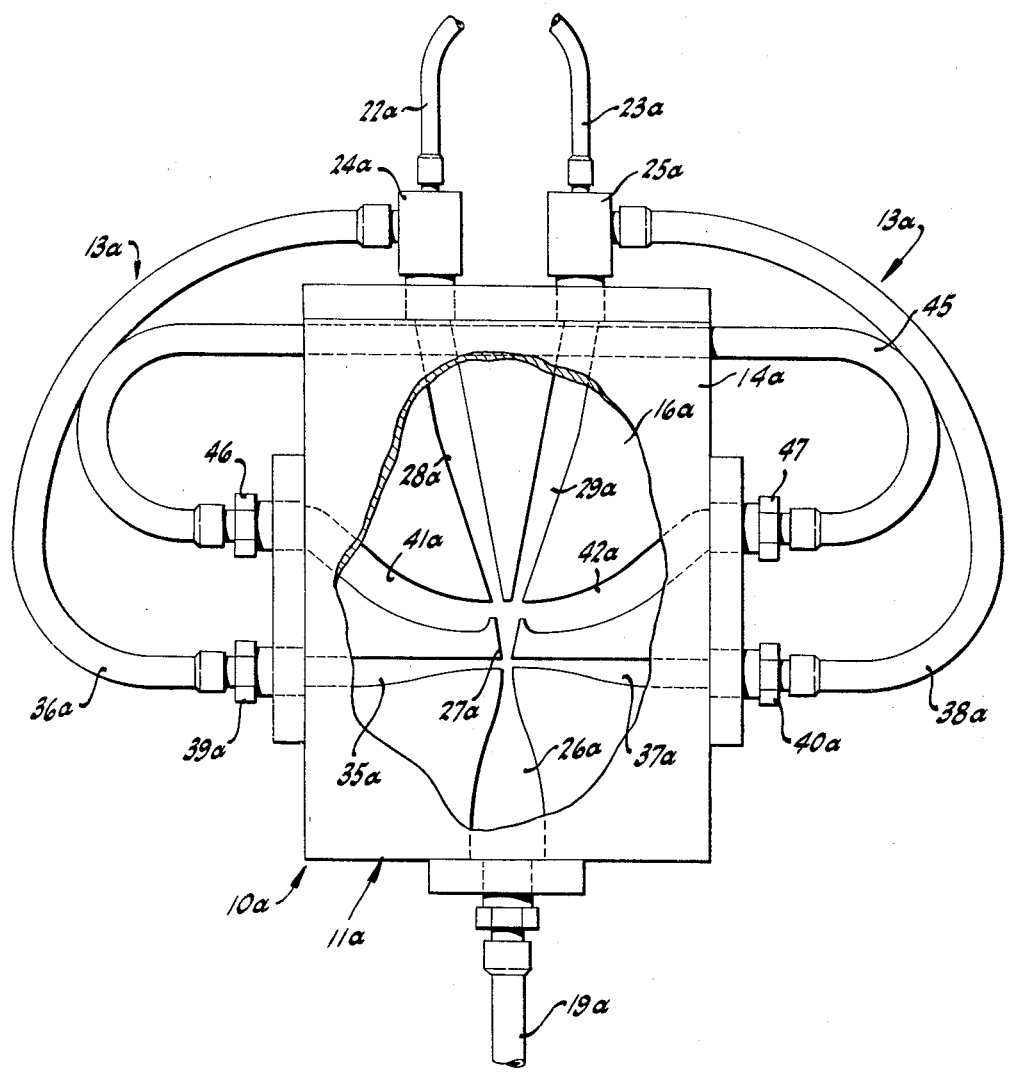

Filed Aug. 17, 1966 3 Sheets-Sheet 3

INVENTOR
ROBERT J. WALKER
BY
Stanley Bialos
ATTORNEY

United States Patent Office 3,507,275
Patented Apr. 21, 1970

3,507,275
MOUTH FLUSHING APPARATUS
Robert J. Walker, 2942 Linden Ave.,
Berkeley, Calif. 94709
Filed Aug. 17, 1966, Ser. No. 572,966
Int. Cl. A61m *11/00;* A61h *9/00*
U.S. Cl. 128—173                    8 Claims

ABSTRACT OF THE DISCLOSURE

Apparatus for flushing the teeth and gum tissues with a moving stream of water to remove debris therefrom. The apparatus includes a plurality of supply passages converging at a single orifice through which such stream of water discharges. The stream cyclically and repetitively traverses a path of travel while the orifice remains in a fixed position because of changes in the relative volumetric flows of water through the supply passages.

---

This invention relates to apparatus for producing a fluid jet that is automatically movable along a path of travel, and which apparatus is especially useful as an instrument for flushing debris from about the teeth and gum tissues of the mouth.

Dental diseases are one of the most prevalent of all chronic diseases which afflict mankind, and there is, consequently, a widespread need for improved instruments and techniques which may be helpful in reducing the incident of dental caries and periodontal diseases. With respect to such diseases, there is dental opinion that both dental caries and periodontal disintegration are associated with the continued presence of complex, adherent collections of mucoidal secretions and bacterial colonies in those sheltered regions of the mouth where decay and gingival disturbances originate; and although some authorities believe food debris plays a minor role in the maintainence of the bacterial community, it at least plays a transient role as a source of nutrient therefor and it may play an important role in the tendency to collect and in the adherence of such mucoidal secretions.

Accordingly, it is supposed that the removal of food particles from the mouth is at least an aid to good oral hygiene in that it may reduce the population of the bacterial colonies by depriving the same of nutrient, and it may also tend to reduce the collection and adherence of such mucoidal secretions. Further, and in any event, direct removal or dislodgment of the bacterial colonies and of the mucoidal secretions would be a distinct aid to good oral hygiene by removing a primary cause of dental caries and periodontal diseases.

In view of this, several relatively new instruments are currently being marketed which are intended to be of help in removing such debris from the mouth by washing the tooth and gum structures thereof in a water bath to flush therefrom debris which is not ordinarily dislodged by normal brushing or other usual oral hygiene techniques. At least one such instrument provides a steady flow of water that is discharged through an orifice as a continuous straight-line stream for direction against a selected area of the tooth and gum structures. Another such instrument provides an intermittent discharge of water through an orifice and such discharge also defines a straight-line stream adapted to be directed against a selected area in the mouth. In each instance, these instruments are helpful but have the same general limitations; namely, that whether the water discharge is continuous or intermittent, it flows in one particular straight-line direction until the discharge orifice is manually moved, and may be ineffective to dislodge and wash away materials which do not have a free path of movement in the direction of the water discharge.

In view of the foregoing, an object, among others, of the present invention is in the provision of an improved apparatus especially adapted for use as an aid in oral hygiene, and which apparatus utilizes the advantages of a moving or travelling jet of fluid (such as that provided by the manually-imparted back-and-forth movement of the steady-flow jet discharge from the nozzle of a water hose, for example) to flush materials from surfaces and other locations, such as the flushing of debris from the tooth and gum structures of the mouth. In accomplishing this object, a plurality of streams of a fluid, usually water, are brought together in a mixing chamber for discharge through a nozzle orifice, and the relative flows of fluid in such streams are cyclically varied to change the direction or path of discharge of the fluid jet.

Embodiments of the invention are illustrated in the accompanying drawings in which:

FIGURE 1 is a top plan view of apparatus embodying the invention;

FIGURE 2 is a broken longitudinal sectional view taken along the plane 2—2 of FIGURE 1;

FIGURE 3 is a transverse sectional view taken along the plane 3—3 of FIGURE 1;

FIGURE 4 is an angular sectional view through the nozzle structure taken along the line 4—4 of FIGURE 3;

FIGURE 5 is a top plan view similar to that of FIGURE 1 but illustrating a modification of the apparatus;

Figure 6:
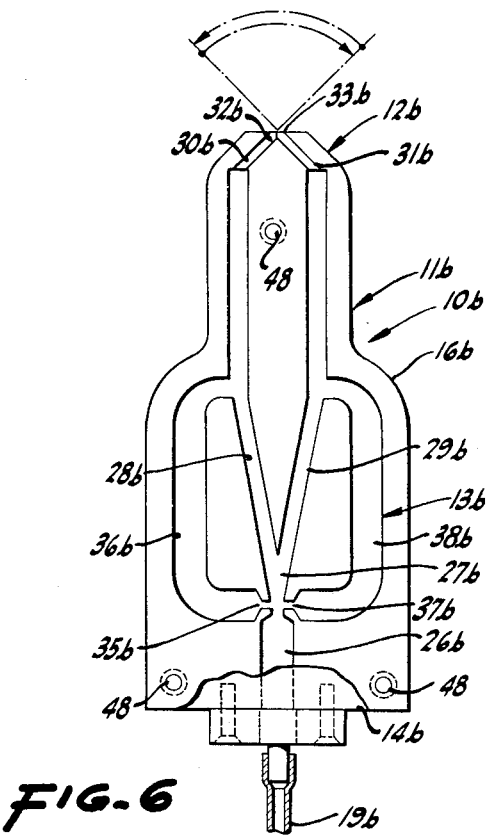
FIGURE 6 is a top plan view of a further modified apparatus.

Each embodiment of the invention illustrated in the drawings is especially suited for use as an instrument for employment in the practice of oral hygiene, and the structural exemplification of each embodiment provides a liquid discharge in the form of a jet that automatically traverses a path of travel as the instrument remains fixed. The particular embodiment of the apparatus shown in FIGURE 1 is donated in its entirety with the numeral 10, and comprises a control device 11, a nozzle structure 12, and feedback loops collectively designated by the numeral 13. The control device 11 may be substantially conventional and can be a fluid-interaction control device such as the unit sold under Model No. FD 2212-3-1321 by Fluidonics of Chicago, Ill., a Division of Imperial-Eastman Corporation.

As shown most clearly in FIGURE 2, the control device 11 illustrated comprises a tripartite body member formed of fluid impervious top and bottom walls 14 and 15 which respectively extend along the opposite faces of an inner passage-providing component 16 in contiguous relation with the opposite faces thereof. The elements 14, 15 and 16 are secured to each other in the sandwich form illustrated by any suitable means, as for example, by means of an adhesive bond between the juxtaposed surfaces thereof.

The control device 11 is provided with an inlet opening 17 adapted to be connected to a suitable source of fluid through a fitting 18 and tube or conduit 19. In the case of the apparatus 10 being used for oral hygiene purposes, such source of fluid ordinarily will be water supplied from a faucet or other convenient outlet. The device 11 is also provided with a pair of outlet openings 20 and 21 which in the embodiment illustrated in FIGURE 1 are respectively connected via tubes or conduits 22 and 23 to the nozzle 12. The conduits 22 and 23 are flexible members and may be formed of any suitable material such as rubber (natural or synthetic), plastic (vinyl chloride, for example), etc. In the specific form shown, a pair of fittings 24 and 25 are respectively disposed between the outlet openings and the respectively associated conduits 22 and 23, and such fittings are in the form of connector T's, the purpose of which will be elaborated hereinafter.

As shown in the drawings, the top and bottom walls 14 and 15 are substantially planar components with unbroken surface areas. The component 16, however, is provided with a plurality of passages therein, one of which is an inlet or supply passage 26 communicating at one end with the inlet opening 17 and converging adjacent its other end to merge with the restricted entrance of a control chamber 27. Connected with the control chamber 27 to receive fluid therefrom are a pair of passages 28 and 29 which are respectively connected to the outlet openings 20 and 21. Evidently then, two flow paths are defined from the inlet opening 17 to the nozzle 12 and respectively constitute the supply passage 26, control chamber 27, passage 28, outlet opening 20 and conduit 22, and the supply passage 26, control chamber 27, passage 29 and conduit 23. The character of the fluid flow along these paths varies cyclically and will be described in detail hereinafter.

Referring to FIGURE 3, it will be seen that two flow paths are also provided through the nozzle 12 and respectively comprise nozzle passages 30 and 31 which are angularly disposed with respect to each other and are oriented to intersect and define a mixing chamber 32 thereat. The mixing chamber terminates in a discharge orifice 33 through which fluid is discharged as a jet that cyclically traverses an arcuate path diagrammatically indicated in FIGURE 3 and generally denoted with the numeral 34. In the particular nozzle 12 being considered, the included angle defined by the intersection of the passages 30 and 31 is substantially 90° but other angles can be selected. In this respect the arcuate path of travel denoted at 34 has a length of approximately 90° when the angle of intersection of the passages is substantially 90°. However, the length of the arcuate path will correspondingly increase and decrease in accordance with any change in the angle of intersection of the passages.

The feedback loops 13 respectively communicate with the control chamber 27 and with the flow passages downstream of the chamber. In the embodiment shown in FIGURE 1, such communication is defined in one instance by an internal passage section 35 and an external tube or passage section 36 connected therewith, and in the other instance by an internal passage section 37 and an external tube or passage section 38. In the first such loop, the passage section 35 communicates at one end with the control chamber 27 along a lateral edge thereof and enters the chamber so as to form an angle of substantially 90° with the median flow path therethrough. At its other end the passage section 35 is connected to the external passage section 36 through a fitting 39, and the section 36 in turn is connected to one branch of the T-shaped fitting 24. In an analogous manner the internal passage section 37 communicates with the control chamber 27 at a substantially normal angle with respect to the flow path therethrough and is connected to the external passage section 38 through a fitting 40, and the section 38 in turn is connected to one branch of the T-shaped fitting 25.

The particular device 11 being considered is also provided with a pair of ventilation passages 41 and 42 which communicate at the inner ends thereof with the control chamber 27 downstream of the point of connection of the control passages 35 and 37 therewith. In the embodiment of the apparatus shown in FIGURE 1 the ventilation passages 41 and 42 are closed by plugs 43 and 44, respectively, which have the effect of making such ventilation passages inoperative. However, in the embodiment of the apparatus shown in FIGURE 5 which otherwise corresponds in all respects to the apparatus illustrated in FIGURE 1, the ventilation passages provided by the control device are connected together by an external conduit. Such interconnection of the ventilation passages has the effect of reducing the cyclic frequency of the discharging jet in its traversal of the arcuate path 34. This characteristic will be disclosed in specific terms hereinafter.

Since the embodiment of the invention shown in FIGURE 5 is essentially the same as the embodiment illustrated in FIGURE 1, the same numerals are employed to identify the respectively corresponding components except that the suffix $a$ has been added to each number for purposes of differentiation. The conduit interconnecting the ventilation passages 41 and 42, being a new element in the embodiment of FIGURE 5, is denoted with the numeral 45 and the couplings at the ends thereof are respectively designated with the numerals 46 and 47.

Figure 7:
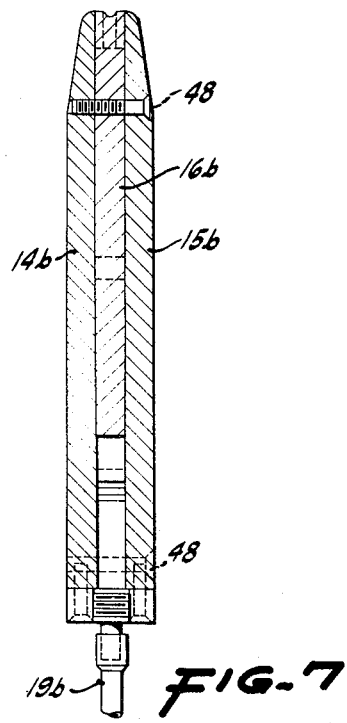
FIGURE 7 is a side view in elevation of the modified apparatus shown in FIGURE 6.

Prior to describing the operational characteristics of the embodiments of the apparatus respectively shown in FIGURES 1 through 4 and FIGURE 5, the structural features of the embodiment illustrated in FIGURES 6 and 7 will be considered because of the general similarity and correspondence to the various components thereof to the prior embodiments. Essentially, the primary difference as between the embodiment shown in FIGURES 6 and 7 and the prior described embodiments is that the entire apparatus is contained within a unitary structure that may be made relatively small and convenient to manipulate in the use thereof as an aid in oral hygiene. Again, because of the correspondence of the structural elements, the same numerals are employed to designate respectively corresponding components, except that the suffix $b$ has been added where appropriate; and to facilitate the analogy with the prior embodiment, the apparatus 10$b$ is considered to be divisible into a control device 11$b$, a nozzle structure 12$b$ and feedback loops collectively denoted 13$b$.

In structural terms, the apparatus includes a body in the form of a sandwich constructed of top and bottom walls 14$b$ and 15$b$ and an inner passage-defining member 16$b$ confined between such top and bottom walls. The three components 14$b$, 15$b$ and 16$b$ may be held together in any suitable manner such as by means of the screw-type fasteners 48 shown. The component 16$b$ is provided with a supply passage 26$b$, a control chamber 27$b$ communicating therewith, flow passages 28$b$ and 29$b$ leading from the control chamber, nozzle passages 30$b$ and 31$b$ respectively connected to the passages 28$b$ and 29$b$ and meeting at a mixing chamber 32$b$, and an orifice 33$b$.

The component 16$b$ further provides feedback passage sections 35$b$ and 37$b$ of reduced cross-section connecting with the control chamber 27$b$ and larger discharge sections 36$b$ and 38$b$ which respectively connect with such passage sections 35$b$ and 37$b$ and also with the flow passages 28$b$ and 29$b$ downstream of the control chamber 27$b$. The supply passage 26$b$ is adapted to be connected through an inlet opening defined at the end thereof with a conduit 19$b$ adapted to communicate with a suitable source of fluid. The locations of mergence of the relatively large flow passages 28$b$ and 29$b$ with the smaller nozzle passages 30$b$ and 31$b$ may be taken to be the outlet openings identified by the numerals 20 and 21 in the embodiment of the apparatus shown in FIGURE 1.

Considering the operating characteristics of the apparatus and referring in particular to FIGURES 1 through 4, the conduit 19 will be connected to a suitable source of fluid which in use of the apparatus for flushing the teeth and gum tissues will be a water supply line, and the connection thereto will usually be made at the mixing outlet of a faucet structure controlling the flow of hot and cold water into a suitable basin or other receptacle, which connection to a mixing outlet permits the temperature of the water jet to be adjusted. The water being under pressure flows through the conduit 19 and into the supply passage 17, and such flow will be substantially continuous and will occur at a relatively uniform pressure. Due to slight asymmetry in the two flow paths resulting from manufacturing tolerances (or purposely introduced), the flow of fluid will not divide equally into the passages 28 and 29, but instead, the flow initially will tend to be through either one or the other of such passages. For purposes of specificity take, for example, the case in which the fluid flow commences in the passage 28, in this instance the flow path will be from the supply passage 26, into the control chamber 27, through the passage 28 and conduit 22 into the nozzle passage 30 and outwardly therefrom through the discharge orifice 33.

The fluid mechanic principles characterizing the mode or manner of operation of the device 11 will depend upon the type of device being employed. In the present instance, the device 11 is in the nature of a bi-stable amplifier in which each stable phase or condition of operation is the result of the "boundary-layer" or "Coanda" effect in which the fluid flowing through any one of the passage systems attaches itself to the wall thereof which wall attachment tends to stabilize the device in such condition of operation until some disturbing force causes the flow to be diverted into another passage system. Following any such diversion into another passage system, the wall-attachment effect is again repeated and the device then remains stable in such second condition of operation.

The wall-attachment effect is the result of a pressure difference on opposite sides of the fluid stream, and in the device 11 being considered, the wall attachment occurs slightly downstream of the location at which the feedback passage sections 35 and 37 communicate with the mixing chamber 27. In the instance of each passage system, the wall portion along which the fluid stream attaches itself is the outer wall surface, so that the pressure along the attachment wall just upstream of the location of attachment will be less than on the opposite side of the stream at the same location. Thus, in the foregoing example in which the flow initially commences in the passage 28, the fluid will attach itself to the left-hand side or outer surface of the passage slightly downstream of the point of communication of the feedback passage section 35 with the control chamber 27; and the pressure adjacent the passage section 35 will be less (possibly sub-atmospheric, for example) than the pressure adjacent the passage section 37 (which might be atmospheric, for example).

Since the flow velocity of any stream must increase wherever the cross-sectional area of the flow path diminishes if the volumetric flow is to remain constant, the flow velocity through the control chamber 27 will be greater than the flow velocity through the passages 26 and 28 and, similarly, the flow velocity through the restricted nozzle passage 30 will increase to cause the liquid to discharge through the orifice 33 as a fluid jet. However, as the flow velocity increases through the nozzle passage 30 the pressure within the conduit 22 tends to increase slightly with the result that a portion of the flow is diverted through the feedback loop defined by the external passage section 36 and internal passage section 35.

The resulting feedback flow of fluid through such loop tends to increase the pressure at the opening of the passage section 35 into the control chamber 27, thereby disturbing the pressure differential across the fluid stream which causes the wall-attachment effect with the result that the flow tends to be diverted toward the passage 29. Also, the fluid flow through the loop is increased in velocity adjacent the control chamber 27 because of the constriction thereat in the internal passage section 35, and the discharging fluid from such passage section 35 impinges at relatively high velocity against the main stream flowing through the control chamber 27 further tending to divert the stream toward the passage 29.

As a consequence primarily of such change in pressure differential across the stream and secondarily of such impingement (the angle of which is substantially normal to the direction of flow of the main stream, i.e., the median flow path thereof) of the feedback flow against the main stream, the direction of flow of such main stream is changed to the passage 29, and the fluid attaches itself to such passage for the reasons heretofore described. The flow path then followed by the fluid is from the supply passage 26 into the control chamber 27, through the passage 29 and conduit 23 into the nozzle passage 31, and outwardly therefrom through the discharge orifice 33.

As in the described case of the nozzle passage 30, the velocity of the fluid flowing through the nozzle passage 31 is increased because of the relatively small cross-sectional area thereof whereupon the resulting slight back pressure in the conduit 23 causes a portion of the fluid flow to be diverted into the feedback loop defined by the passage sections 38 and 37. Such feedback flow quickly increases to the point that the attachment-causing pressure differential is disturbed, as previously described, and as a result thereof and of the feedback flow impinging against the main stream, the flow is diverted from the passage 29 and into the passage 28. Upon such occurrence, a cycle of operation has been completed, and this cyclical operation continues automatically and repetitively at a frequency determined by the geometric and structural characteristics of the apparatus and especially the length of the feedback loops.

Figure 8:
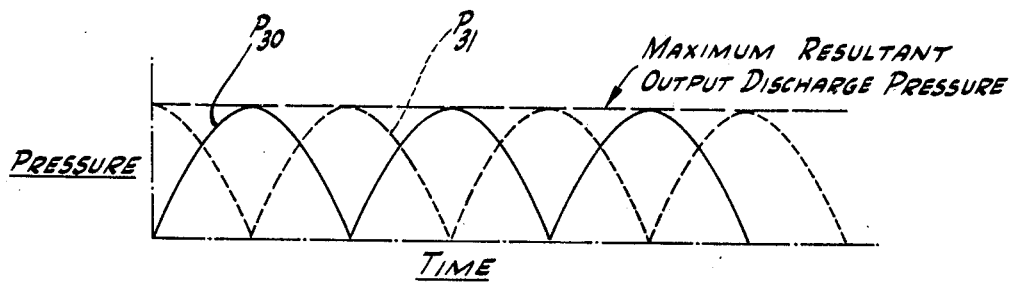
FIGURE 8 is a graph illustrating pressure waveforms at the discharge orifice of the nozzle of the device.

It may be noted that although the flow is switched quite rapidly from one passage to the other, the change in flow at the discharge orifice 33 is continuous and progressive. As a result the jet discharge through the orifice 33 tends to traverse the path of travel 34 at a relatively uniform rate, even though the pressure in each flow path downstream of the control chamber 27 cyclically varies between maximum and minimum values in accordance with changes in the flow volumes therethrough. In the particular apparatus being considered, the pressure waveform in each of the flow paths (at the nozzle passages 30 and 31, for example) tends to have a generally sinusoidal shape, the pure form of which may be taken to be an optimal condition, and varies, as indicated in FIGURE 8, between a substantially zero pressure (gage) and a maximum pressure which maximum pressure may differ slightly in value in accordance with the flow velocity of the fluid at any point of measurement. That is to say, if a point of measurement constitutes a restricted cross-sectional area, the velocity of the fluid flow will be greater thereat and the pressure will correspondingly be reduced. In any event, however, at any particular point along the flow path, the pressure varies cyclically between some minimum value which may approximate atmospheric pressure and some maximum value approximating the difference between line pressure and the pressure losses in the apparatus.

In the FIGURE 8 illustration of the waveform, the X-axis or abscissa denotes time and the Y-axis or ordinate denotes pressure with the aforementioned minimum pressure being coincident with the X-axis and the maximum pressure being denoted "maximum resultant pressure discharge." The waveform depicted in full lines may be taken to be the pressure waveform appearing at the nozzle passage 30 and for convenience is denoted with the legend $P_{30}$. Similarly, the waveform depicted in broken lines may be taken to be the pressure waveform appearing at the nozzle passage 31 and is denoted $P_{31}$. These waveforms are seen to be out of phase by approximately 180°, and the vector summation thereof at any point of time is substantially equal to such "maximum resultant pressure discharge," which resultant pressure is substantially constant because the nozzle passages intersect at an angle of 90°, as considered further hereinafter.

Referring to FIGURE 3 it is seen that the aforementioned arcuate path 34 traversed by the fluid jet is fan-shaped and has an angular length of substantially 90° which corresponds to the angle of intersection of the nozzle passages 30 and 31. This path of travel is obtained in the following manner:

Take the aforementioned case in which substantially all of the fluid flow is initially into the passage 28 and through the nozzle passage 30, it will be evident that the direction of fluid discharge through the orifice 33 will be in substantial alignment with the longitudinal axis of the passage 30 and therefore defines one extremity of the flow path 34. As the flow is diverted from the passage 28 and into the passage 29, the two streams respectively moving through the nozzle passages 30 and 31 and into mixing chamber 32 before the diversion or switching is complete, will interact or mix and provide a resultant flow the direction of which will be intermediate the two outer extremities of the arcuate path 34. The precise direction or location of the fluid jet at any instant will be determined by the relative values of the two fluid streams at such instant. When the diversion of the flow into the passage 29 is completed, substantially the entire flow at the nozzle will be through the passage 31 thereof and the direction of fluid discharge through the orifice 33 will be in substantial alignment with the longitudinal axis of the passage 31 and therefore defines the other extremity of the flow path 34.

Evidently, then, the fluid jet discharge from the orifice 33 cyclically traverses a path 34 between the two extremities thereof which extremities substantially correspond to the longitudinal axes of the nozzle passages 30 and 31. Accordingly, as the included angle defined by such passages is either increased or decreased, the extremities or outer limits of the flow path 34 will change correspondingly. In any event, the fluid jet traverses such path in a repetitive cycle of operation and in the particular apparatus being considered, such cycle of operation is a periodic function.

It should be noted that although the direction of the fluid jet changes with time, the fluid pressure at the orifice 33 is substantially constant and comprises the individual fluid pressures respectively present in the nozzle passages 30 and 31. Thus and referring to FIGURE 8, since the pressure waveforms are substantially 180° out of phase and the angle of intersection of the nozzle passages is 90°, the pressure $P_{30}$ is increasing as the pressure $P_{31}$ is decreasing and at any instant the vector summation of the contemporaneous values thereof approximates the maximum resultant value.

In this respect it may be convenient to consider the fluid jet in mathematical terms as being the resultant $c$ of two vectors of magnitudes $a$ and $b$ which intersect at an angle A. Thus the resultant pressure or the velocity of the jet may be determined from the expression $$c = \sqrt{a^2 + b^2 + 2ab \cos A}$$

When the angle of intersection of the two passages 30 and 31 is 90°, as in the apparatus being considered, the final term of such expression becomes zero because the cos of 90° is zero. In such case the pressure of the fluid jet is constant and will have substantially the same value at any position along the path of travel 34. Also in the particular apparatus under consideration, the jet will traverse the path 34 in a manner such that its motion will be linear with respect to time. It may be concluded therefore, that the fluid jet discharge through the orifice 33 is continuous, it has a substantially constant pressure comprising the vector sum of the instantaneous pressures in the nozzle passages 30 and 31, and it traverses the path 34 at a uniform rate in a cyclically repetitive manner.

The rate of oscillation of the fluid jet in its traversal of the path 34 is influenced by a number of parameters such as the fluid pressures in the streams flowing through the passages 30 and 31, but is mainly a function of the lengths of the feedback loops 13 and can be varied most conveniently by altering the lengths thereof. Not only can the rate of oscillation be selectively varied, but the shape of the path traversed by the jet can also be changed as, for example, by altering the character of the intersection of the nozzle passages 30 and 31, by changing the relative flow volumes through such passages, and by providing additional nozzle passages (and flow paths connected therewith) which open into the mixing chamber 32. As indicated hereinbefore, the flow volumes through the nozzle passages 30 and 31 in the present apparatus have substantially equal maximum values and such passages lie along or define a common plane. Accordingly, the path of travel 34 is arcuate and is fan-shaped.

By way of example for the purpose of providing an indication of the size and characteristics of a particular apparatus, an apparatus of the type illustrated in FIGURES 1 through 4 was used to provide a liquid jet useful for irrigating or flushing the teeth and gum tissues of the mouth. Such apparatus comprised an oscillator-type fluid-interaction control device 11, as identified hereinbefore (i.e. Model No. FD 2212–3–1321 and sold by Fluidonics), to which were connected external conduits 22 and 23 which were each 9½ inches in length and had an internal diameter of 3/16 of an inch. Also connected to such device 11 were external conduit sections 36 and 38 each of which was 28 inches in length and had an internal diameter of 3/16 of an inch. A nozzle structure 12, as illustrated, was connected to such conduits 22 and 23 and the passages 30 and 31 of such nozzle were each ⅛ of an inch in length and had a diameter of 0.040 of an inch. Such nozzle passages 30 and 31 intersected as shown in FIGURE 3 and defined an included angle of substantially 90°. The device 11 was then connected to a supply of water delivering the same at a pressure of approximately 30 p.s.i.g. The device 11 had ventilation passages 41 and 42, as shown in FIGURE 1, and such passages were closed. The apparatus under such conditions was found to provide a liquid jet discharge through the orifice 33 which cyclically traversed an arcuate path at a frequency of approximately 1175 cycles per minute.

The apparatus was also operated with the ventilation passages 41 and 42 interconnected, as shown in FIGURE 5, by a tubular conduit 45 having a length of six inches and an internal diameter of 3/16 of an inch. The apparatus under such conditions produced a liquid jet that cyclically traversed an arcuate path at a frequency of approximately 1060 cycles per minute. Thus with the ventilation passages interconnected, the apparatus produced a fluid jet having a cyclic repetition rate somewhat less than the case in which the ventilation passages were closed and the action of the apparatus may be considered to be somewhat more stable as evidenced by such reduction in frequency.

As indicated hereinbefore, the apparatus is especially useful as an aid in oral hygiene and in such environment is operative to provide a liquid jet which moves along a path to enable it to cover a relatively large area without requiring movement of the nozzle structure and which is effective to dislodge debris held by the tooth and gum structures because of the flushing action defined by the jet. The movement of the jet and flushing action resulting therefrom is effected as explained heretofore by providing a plurality of fluid streams which merge adjacent a discharge orifice and by cyclically varying the relative fluid flows of such streams to change correspondingly the position of the jet.

While in the foregoing specification embodiments of the invention have been described in considerable detail for purposes of making a complete disclosure thereof, it will be apparent to those skilled in the art that numerous changes may be made in such details without departing from the spirit and principles of the invention.

What is claimed is:

1. Apparatus for providing a fluid jet discharge which cyclically traverses a path of travel, comprising a body member provided with a fluid inlet opening and provided also with a control chamber in flow communication therewith, said body member being further provided with a plurality of flow passages respectively communicating with said control chamber to receive fluid therefrom, a nozzle structure having a single discharge orifice and a mixing chamber in open communication therewith and further having a plurality of nozzle passages respectively connected with said flow passages and with said mixing chamber and being angularly disposed relative to each other toward convergence adjacent said mixing chamber, and a plurality of feedback loops respectively connected with said flow passages and with said control chamber and being operative to change cyclically the relative fluid flows through said flow passages, the discharge of fluid through said orifice for any fixed position of said nozzle structure having a direction at any instant dependent upon the relative fluid flows through said nozzle passages and consequently through said flow passages whereby the discharge from said orifice constitutes a fluid jet which cyclically traverses a path of travel enforced thereon by changes in the relative fluid flows through said flow passages.

2. The apparatus of claim 1 in which said nozzle structure is integral with said body member.

3. The apparatus of claim 1 in which said nozzle structure is remote from said body member, and in which a plurality of flow conduit members respectively connect said nozzle passages with said flow passages.

4. The apparatus of claim 3 in which said flow conduit members are flexible.

5. The apparatus of claim 1 in which at least certain of said nozzle passages lie in a common plane and intersect adjacent said orifice.

6. The apparatus of claim 5 in which said nozzle passages comprise two which intersect adjacent said orifice at an angle approximating 90°, whereby the path traversed by the fluid jet discharge from said orifice is substantially 90° in angular length.

7. The apparatus of claim 5 in which said nozzle passages comprise two and the pressure waveforms thereat are substantially 180° out of phase.

8. The apparatus of claim 7 in which said waveforms generally approximate a sinusoidal shape.

References Cited

UNITED STATES PATENTS

| | | | |
|---|---|---|---|
| 1,979,006 | 10/1934 | Moran | 128—229 |
| 2,550,565 | 4/1951 | Hyser | 128—229 |
| 2,564,639 | 8/1951 | Cuppett et al. | 239—98 |
| 2,672,143 | 3/1954 | Gold et al. | 128—239 |
| 3,213,471 | 10/1965 | Freeman. | |
| 3,227,158 | 1/1966 | Mattingly | 128—66 |
| 3,227,380 | 1/1966 | Pinkston. | |
| 3,244,189 | 4/1966 | Bailey | 137—81.5 |
| 3,379,192 | 4/1968 | Warren | 128—66 |

FOREIGN PATENTS

| | | |
|---|---|---|
| 551,142 | 1/1958 | Canada. |
| 674,665 | 11/1963 | Canada. |
| 693,965 | 9/1964 | Canada. |

RICHARD A. GAUDET, Primary Examiner

K. L. HOWELL, Assistant Examiner

U.S. Cl. X.R.

128—66, 229, 239; 239—543